J. C. FLEMING.
VENTILATING APPARATUS.
APPLICATION FILED APR. 18, 1913.
1,101,489.
Patented June 23, 1914.
2 SHEETS—SHEET 1.
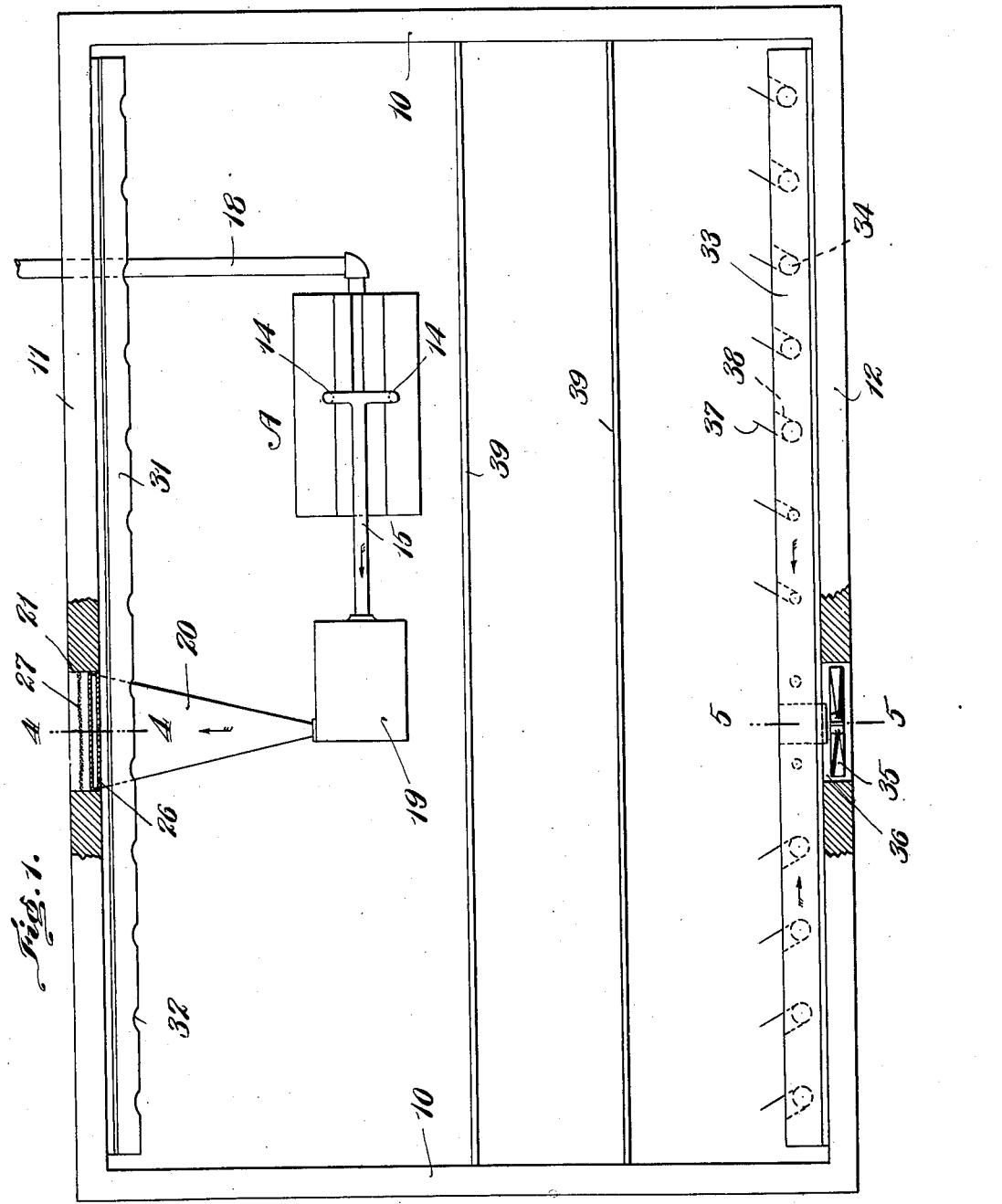

J. C. FLEMING.
VENTILATING APPARATUS.
APPLICATION FILED APR. 18, 1913.
1,101,489.
Patented June 23, 1914.
2 SHEETS—SHEET 2.
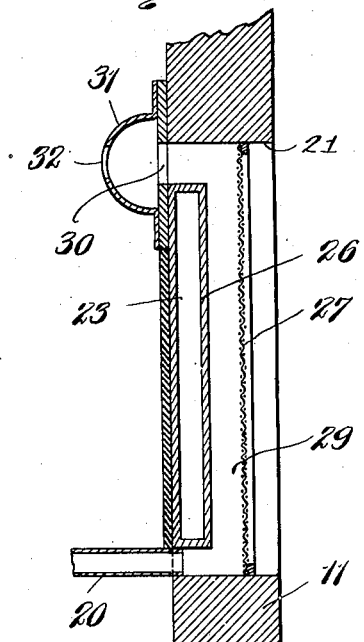
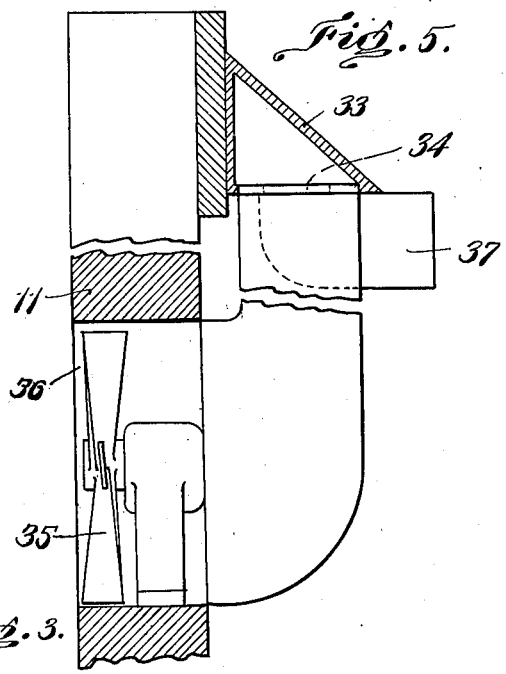
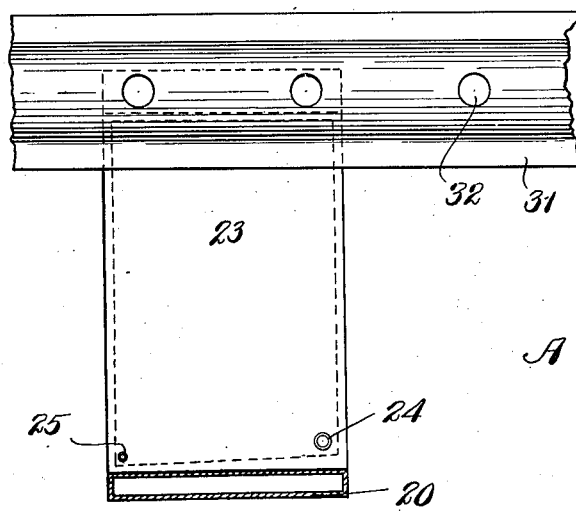
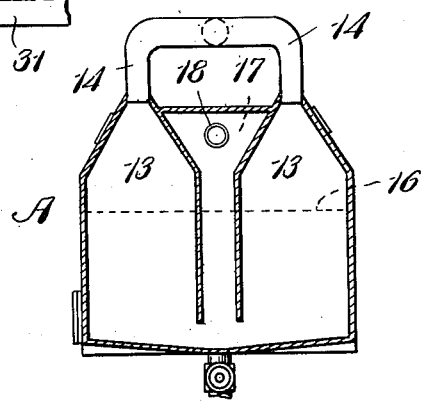
Witnesses:
Inventor:
John C. Fleming
by Wright Brown Quinby May
Attys.

UNITED STATES PATENT OFFICE.

JOHN C. FLEMING, OF BOSTON, MASSACHUSETTS, ASSIGNOR TO WALTER J. BERWICK, OF NORWOOD, MASSACHUSETTS.

VENTILATING APPARATUS.

1,101,489.      Specification of Letters Patent.     Patented June 23, 1914.

Application filed April 18, 1913. Serial No. 762,087.

*To all whom it may concern:*

Be it known that I, JOHN C. FLEMING, a citizen of the United States, and resident of Boston, in the county of Suffolk and State of Massachusetts, have invented certain new and useful Improvements in Ventilating Apparatus, of which the following is a specification.

This invention has relation to air purifying and ventilating systems for use in work shops, schools, dwellings and other places where it is desired to have a supply of pure fresh air.

In carrying out my invention, I first cause the air which is to be used to be passed through a cleansing and purifying solution, after which any excess moisture is removed therefrom, and the air thus purified and dried is admitted to the chamber where it is to be used. The chamber is also provided with an exhaust fan, blower or pump for forcing out the used and impure air and insuring the circulation of the fresh air to the room and rarefying the air in the room.

On the accompanying drawings, Figure 1 represents conventionally a room and the apparatus which I use causing the circulation of purified and dried air therethrough. Fig. 2 represents an end elevation of what I term the air-purifying apparatus. Fig. 3 shows the air heater and a portion of the distributor. Fig. 4 represents a section on the line 4—4 of Fig. 1. Fig. 5 represents an enlarged section on the line 5—5 of Fig. 1 and shows the eduction conduit.

On the drawings, I have conventionally shown a simplified embodiment of the invention without attempting to illustrate the parts or instrumentalities in their relative proportions, as of course these will vary greatly according to the requirements.

In Fig. 1 the four walls 10, 10, 11 and 12 form an inclosed chamber such as a room in a factory, school, dwelling or public institution. The wall 12 may be taken to be an outside wall which is exposed to the exterior atmosphere, and, as shown, it is provided with an opening which may be of any desirable dimensions. Within the room or in some convenient place I place the purifying apparatus which is indicated as a whole at A. This apparatus comprises a liquid sealed chamber having one or more domes, 13, 13, from which lead conduits 14 to a main conduit 15, as shown in Figs. 1 and 2. The inner walls of the dome extend downward, as shown in dotted lines, below the surface of the liquid therein, the level of which is indicated at 16. Between the two domes there is an air chamber indicated at 17 having a relatively small air inlet above the normal liquid level, to which leads an inlet conduit 18, the other end of which opens into the exterior atmosphere. I employ in the apparatus A any suitable cleansing and purifying liquid, although preferably I employ an alkaline solution such as potassium carbonate. This may or may not be refrigerated, as desired. Communicating with the conduit 15 there is an air pump 19. This is illustrated conventionally, but an air pump of any suitable type, style or kind adapted for the purpose may be employed. When the pump is in operation, air is drawn thereby from the exterior atmosphere through the conduit 18 into the chamber 17, and therefrom through the purifying solution into the domes 13, thence through the conduits 14 and 15, and is delivered from the pump to a conduit indicated at 20. Any suitable liquid sealed purifying or cleansing apparatus in combination with any suitable pump may be employed.

In passing through the purifying apparatus, all dust, carbon, and impurities are effectively removed from the air, and, if the solution is refrigerated, the air is also dried to a considerable extent. To complete the drying of the air or to effect its drying in the event that the purifying solution is at normal temperatures, I employ the apparatus shown in Figs. 1, 3 and 4. It will be noted that the conduit 20 is flattened and is laterally expanded so as to have a large wide mouth as shown in Fig. 3. Arranged in the opening 21 in the exterior wall 12 there is a heater 23 which is employed in tempering the air in cold weather, so as to deliver it at the normal temperature desired in the room. This heater consists of a hollow casing to which is connected a steam pipe 24 so that steam may be delivered thereto. A drip pipe is indicated at 25. The casing is shown as having a flat rear wall 26 and its front wall may be covered with insulations to prevent waste of heat. Also set in the opening 21 is a sheet 27 of an absorbent textile material such as closely woven cotton duck, the outer face of which is exposed to the external atmosphere. This sheet is preferably arranged in parallelism with the rear plate 26 of the heater, and are separated far enough therefrom to permit of the passage of the purified air between the sheet 27 and the heater, the conduit thus provided for the air being indicated at 29. The mouth of the conduit 20 fits closely between the lower end of the heater and the lower wall of the opening so that purified air is caused to traverse the conduit 29 when it is delivered from the pump 19. The upper end of the heater is separated from the upper wall of the opening 21 by a passage for the emission of the air and this passage communicates through a port 30 to a conduit 31 which is preferably near the ceiling of the room. This conduit may be formed in any one of a variety of ways and it is provided with a series of exhaust ports 32 for the emission of the air into the room. As the purified air passes through the conduit 29, it is heated by the heater 23 and passes sufficiently in contact with the absorbent sheet 27 to cause the absorption thereby of a part of the moisture in the air. The air passes through the conduit 29 under pressure sufficient to prevent the passage of the exterior atmosphere through the sheets of fabric, and any moisture which is absorbed on the inner face of the fabric evaporates from the outer face and is carried away by the external atmosphere. The conduit 31 preferably extends the length of the room, and, if desired, the ports 32 may gradually increase in diameter as they progress toward the opposite ends of the conduit. Of course it will be understood that steam or other heating medium is employed for the raising of the temperature of the heater only during cold weather, and is only for the purpose of tempering the air. On the opposite side of the room from the conduit 31 and preferably near the ceiling of the room, I arrange another conduit 33. This is illustrated as being substantially triangular in section, see Fig. 5, and in the lower flat wall of the conduit there are inlet apertures 34. The conduit 33 is provided with an outlet port in its upright rear wall, in juxtaposition to which there is a fan or pump 35 of greater capacity than the pump 19. The fan or pump 35 draws the vitiated or impure air from the room and discharges it into the atmosphere. As shown, the fan is arranged in an aperture 36 in the wall 12 and it may be driven by any suitable motive power. An ordinary electric fan of sufficient power may be used for the purpose. The ports 34 gradually increase in diameter from a point adjacent the port 34 to the outer closed ends of the conduit, as indicated in Fig. 1. Secured to the lower wall of the conduit 33 there are deflecting blades 37, 38, of which one is shown in Fig. 5.

I have stated that the inlet and outlet conduits 31, 33 are preferably arranged near the ceiling of the room. In order that the air may be circulated through the room, I provide deflectors which are indicated at 39, and which depend from the ceiling and extend downwardly into the room a sufficient distance to cause the air to be deflected into the lower part of the room. These deflectors may be hinged to the ceiling in such manner as to be swung flat against the ceiling if desired. I have not illustrated the hinges which connect the deflectors to the ceiling, but such construction will be easily understood.

The sheet or sheets of absorbent material constitutes an air drier, there being a heater for delivering air heated to the desired temperature to the room or inclosure. The walls of the opening constitute the top, bottom and end walls of a casing, the front wall of the casing being formed by the heater and the rear wall being formed by the sheet of absorbent material. While for convenience this air drier and heater is shown as arranged in the wall, of course if it were formed separately therefrom, provided the absorbent material is exposed to the external atmosphere, there would be no departure from my invention. I call this arrangement of the sheet an air drier, although of course it is not intended to remove from the air all vestige of moisture. Its purpose is to reduce the humidity of air having excess moisture.

Having thus explained the nature of my said invention and described a way of making and using the same, although without attempting to set forth all of the forms in which it may be made or all of the modes of its use, what I claim is:

1. An air purifying apparatus comprising a receptacle containing an air cleansing solution, and having an air inlet in one end wall above the normal liquid level, an elongated dome having its lower end within the receptacle and sealed within said liquid, a discharge pipe connected with the interior of said dome above the liquid, and a pump connected with said discharge pipe.

2. An air purifying apparatus containing an air cleansing solution, spaced apart domes having their lower ends sealed within said liquid, an air space being provided between said domes and having an air inlet in one wall above the normal liquid level, a discharge pipe connected with the interior of said domes above the liquid, and a pump connected with said discharge pipe.

3. An inclosure provided with an opening in one wall, absorbent material closing said opening and having its outer face exposed to the external atmosphere, an air washing apparatus, and means for causing a stream of air from said washing apparatus to travel past and in contact with the inner face of said absorbent material.

4. An inclosure provided with an opening in one wall, a sheet of textile material closing said opening and having its outer face exposed to the external atmosphere, an air washing apparatus, and means for causing a stream of air from said washing apparatus to travel past and in contact with the inner face of said textile material.

5. An air purifying apparatus comprising a receptacle containing an air cleansing solution, and having an air inlet in one end wall above the normal liquid level, an elongated dome having its lower end within the receptacle and sealed within said liquid, a discharge pipe connected with the interior of said dome above the liquid, a pump connected with said discharge pipe, and means for heating the purified air.

6. A ventilating apparatus comprising an air passage one wall of which is formed of a sheet of absorbent material exposed to the external atmosphere, an air washing apparatus, and means for causing a stream of air from said washing apparatus to travel through said passage.

7. The combination with a chamber containing a cleansing solution, of a conveyer or passageway having one wall formed of a sheet of absorbent material which is exposed to the external atmosphere, and means for causing a stream of air to first pass through said cleansing solution and then through said conveyer or passageway.

8. A room or inclosure having elongated substantially parallel inlet and outlet conduits arranged therein at opposite sides thereof, said conduits having lateral ports opening into said room or inclosure, means for exhausting air from the outlet conduit, air cleansing means, means for causing air from the external atmosphere to pass through said air cleansing means to said inlet conduit, and deflectors between said conduits for deflecting the air downwardly.

9. A ventilating apparatus comprising an air washing apparatus, a pump for causing air to travel through said washing apparatus, a discharge conduit leading from said pump provided with a widened discharge end, and a passage way connected with the discharge end of said conduit and having one wall formed of absorbent material one face of which is exposed to the external atmosphere.

In testimony whereof I have affixed my signature, in presence of two witnesses.

JOHN C. FLEMING.

Witnesses:
MARCUS B. WAY,
P. W. PEZZETTI.